US007978852B2

United States Patent
Wajs et al.

(10) Patent No.: US 7,978,852 B2
(45) Date of Patent: Jul. 12, 2011

(54) METHOD OF PARTIALLY SCRAMBLING A DATA STREAM

(75) Inventors: Andrew Augustine Wajs, Haarlem (NL); Gerard Johan Dekker, Nieuw-Vennep (NL); David Neil Siedle, Hoofddorp (NL); Roelof Van Wijk, Hoofddorp (NL); Ronaldus Petrus Johannes Hoogenboom, Hoofddorp (NL); James Stewart Crosbie Palmer, Hoofddorp (NL); Thomas Franz Stockhammer, Bergen (DE)

(73) Assignee: Irdeto Access B.V. (NL)

( * ) Notice: Subject to any disclaimer, the term of this patent is extended or adjusted under 35 U.S.C. 154(b) by 1262 days.

(21) Appl. No.: 10/582,762

(22) PCT Filed: Jul. 26, 2004

(86) PCT No.: PCT/EP2004/051604
§ 371 (c)(1),
(2), (4) Date: Jun. 12, 2006

(87) PCT Pub. No.: WO2006/010386
PCT Pub. Date: Feb. 2, 2006

(65) Prior Publication Data
US 2007/0098000 A1    May 3, 2007

(51) Int. Cl.
*H04N 7/167* (2006.01)
(52) U.S. Cl. ........... 380/210; 380/212; 380/287; 725/31
(58) Field of Classification Search ............... 380/210, 380/212, 287; 725/31
See application file for complete search history.

(56) References Cited

U.S. PATENT DOCUMENTS

| 6,415,031 | B1 | 7/2002 | Colligan |
| 7,023,992 | B1* | 4/2006 | Kubota et al. ............. 380/210 |
| 2002/0164024 | A1 | 11/2002 | Arakawa et al. |
| 2003/0081776 | A1* | 5/2003 | Candelore ................ 380/200 |

FOREIGN PATENT DOCUMENTS

| WO | WO-03061289 | 7/2003 |
| WO | WO-2004045213 | 5/2004 |
| WO | WO-2004056112 | 7/2004 |

OTHER PUBLICATIONS

"PCT Search Report for International Appln No. PCTEP2004051604", (May 31, 2005),4 pgs. Allattar, A , et al., "Improved selective encryption techniques for secure transmission of MPEG video bit-streams", *Image Processing*, (1999).
Wiegland, T , et al., "Overview of the H.264/AVC video coding standard", *IEEE Transactions on Circuits and Systems for Video Technology*, 13(7), (Jul. 2003).
"Japanese Application Serial No. 2006-538830, Notice of Reasons for Rejection mailed Jul. 21, 2009", (English Translation), 4 pgs.

* cited by examiner

*Primary Examiner* — Matthew B Smithers
*Assistant Examiner* — Paul Callahan
(74) *Attorney, Agent, or Firm* — Schwegman, Lundberg & Woessner, P.A.

(57) ABSTRACT

A method of partially scrambling a data stream (6) including transport stream packets (7), each transport stream packet (7) having a header (8) and a payload (9), wherein a sequence of transport stream packets (7) has payloads carrying encoded data elements, arranged in units (15), includes: selecting transport stream packets (7) forming a subsequence of the sequence, and scrambling at least part of the payloads (9) of each transport stream packet (7) in the subsequence. The method further includes monitoring the payloads (9) of at least some of the transport stream packets (7) in the sequence for the presence of data (22) indicating a boundary between two subsequent units (15), and, for selected units (15), including at least one of the transport stream packets (7) carrying data forming part of the selected unit (15) in the sub-sequence.

12 Claims, 3 Drawing Sheets

METHOD OF PARTIALLY SCRAMBLING A DATA STREAM

This application is a U.S. National Stage Filing under 35 U.S.C. 371 from International Patent Application No. PCT/EP2004/051604, filed on Jul. 26, 2004, and published as WO 2006/010386 A1 on Feb. 2, 2006, the entire content is incorporated herein by reference.

The invention relates to a method of partially scrambling a data stream including transport stream packets, each transport stream packet having a header and a payload, wherein a sequence of transport stream packets has payloads carrying encoded data elements, arranged in units, including:
selecting transport stream packets forming a sub-sequence of the sequence, and
scrambling at least part of the payloads of each transport stream packet in the sub-sequence.

The invention also relates to a system for partially scrambling a data stream including transport stream packets, each transport stream packet having a header and a payload, wherein a sequence of transport stream packets has payloads carrying encoded data elements, arranged in units, including:
a port for receiving the data stream; and
an arrangement for processing the data in the stream, wherein the system is configured to select transport stream packets forming a sub-sequence of the sequence, and to scramble at least part of the payloads of each transport stream packet in the sub-sequence.

The invention also relates to a computer program.

The invention also relates to a signal carrying a data stream including transport stream packets, each transport stream packet having a header and a payload.

Examples of such a method, system, computer program and signal are known from WO 03/061289-A1. In the known system, a cable system headend selects A/V content packets at a packet selector for encryption. Packets selected for encryption are chosen so that their non-receipt would severely affect the real-time decoding of a program, and any possible post processing of recorded content. That is, only critical packets are encrypted. For the video and audio, this can be accomplished by encrypting "start of frame" transport stream packets containing PES (packetized elementary stream) headers and other headers as part of the payload, since without this information the STB decoder cannot decompress the MPEG compressed data, MPEG-2 streams identify "start of frame" packets with the "Packet Unit Start Indicator" in the transport header. Generally, packets carrying a payload that contains a group of pictures header or a video sequence header can be used to effect the present scrambling technique. Other critical or important packets or content elements may also be identified for encryption that could severely inhibit unauthorized viewing without departing from the present invention. For example, MPEG intra-coded or I frame picture packets could be encrypted to inhibit viewing of the video portion of the program.

A problem of the known method is that the encryption of all TS packet payloads including PES packet headers or a selected critical packet will lead to a stream in which a large percentage of packets have an encrypted payload. This makes the method unsuitable for broadcasting to devices with limited processing capacity for decryption. The mere encryption of only a few of the TS packets payloads including PES packet headers or a selected critical packet will not suffice when the payloads of the packets include audiovisual data encoded using advanced compression techniques with a high degree of resilience to packet loss. In that case, an unauthorized receiver would be able to decode the content using the data left in the clear.

It is an object of the invention to provide a method, system and computer program of the kinds mentioned above, that enable scrambling of the payloads of only a selected few of the transport stream packets whilst maintaining effective content protection in the presence of advanced decoder techniques for coping with missing encoded data.

This object is achieved by means of the method according to the invention, which is characterised by monitoring the payloads of at least some of the transport stream packets in the sequence for the presence of data indicating a boundary between two subsequent units, and, for selected units, including at least one of the transport stream packets carrying data forming part of the selected unit in the sub-sequence.

Because transport stream packets are selected to form a sub-sequence, i.e. a sequence formed of fewer than all of the transport stream packets in the sequence, the descrambling load on a decoder receiving the partially scrambled stream is reduced. Because the encoded data elements are structured in units, they are also processed on a unit-by-unit basis when being decoded. Because the entire payload of the transport stream packets is monitored for the presence of data indicating a boundary between two subsequent units, it is possible to ensure that only selected units are made unintelligible. The number and nature can be made dependent on the decoding process. This also takes account of the fact that the data forming the unit may be carried in the payload of a plurality of transport stream packets. Thus, the scrambling can be tailored more closely to the encoding technique.

In a preferred embodiment, wherein the data stream is a multiplex of elementary streams, the method includes identifying at least one elementary stream including the sequence of transport stream packets and monitoring only payloads of packets in the identified elementary stream(s).

Thus, a relatively efficient method is provided for partially scrambling the transport stream packet payloads.

In a preferred embodiment, the selected units include units containing at least part of an encoded representation of a picture.

This embodiment has a relatively high impact in a decoder. The pictures contained in the respective units are almost invariably the desired output of the decoder, which can no longer be provided without descrambling the transport stream packet payloads containing these selected units.

In a preferred embodiment, wherein each unit contains an indication of the type of data to follow and a part containing that data, the type of each unit in the monitored payloads is determined from the indication and the unit is included among the selected units if the type corresponds to at least one specific type.

Thus, a large reduction in the number of transport stream packets of which the payloads are scrambled is achieved, whilst maintaining effective content protection.

Preferably, units of types other than the specific type(s) are randomly included among the selected units.

Thus, extra content protection is achieved.

In preferred variants of the previous two embodiments, the types are defined by the encoding technique with which the encoded data elements have been formed.

Thus, those packet payloads containing units most critical to the decoding process are selectable for scrambling. This makes the content protection more effective, as it is precisely tailored to the particular CODEC that is used.

In a preferred embodiment, wherein the encoded data elements are decodable using a predictive decoding technique, the specific types include a type of data element allowing a prediction to be derived from only the decoded data belonging to the data element.

Because these data elements allow random access into a stream of encoded data, making them inaccessible has a high impact on the decoding process, which generally cannot start without these encoded data elements.

In a preferred embodiment, up to a maximum number of transport stream packets following a first transport stream packet carrying data forming part of a selected unit are included in the sub-sequence.

This decreases the load on a receiver whilst maintaining adequate protection. The maximum number is chosen so as to make error correction impossible. In particular where the transport stream packets are all of a standard length, including up to a maximum number of all transport stream packets carrying data forming part of the unit avoids scrambling more payloads than is required to render ineffective techniques in a receiver for coping with the loss of data. Thus, effective protection is achieved whilst the burden on an authorised receiver providing access to the partially scrambled stream is kept as low as possible.

According to another aspect, the system according to the invention is characterised in that the system is configured to monitor the payloads of at least some of the transport stream packets in the sequence for the presence of data indicating a boundary between two subsequent units, and, for selected units, to include at least one of the transport stream packets carrying data forming part of the selected unit in the sub-sequence.

The system is suitable for generating a partially scrambled stream in which the data elements are well protected against access by unauthorised receivers, but which does not place large demands on the processing capacity of authorised receivers.

Preferably, the system is configured to include up to a maximum number of transport stream packets following a first transport stream packet carrying data forming part of a selected unit in the sub-sequence, and provided with an arrangement for setting the maximum number.

This decreases the load on a receiver whilst maintaining adequate protection. The maximum number can be set so as to make error correction impossible. In particular where the transport stream packets are all of a standard length, including up to a maximum number of all transport stream packets carrying data forming part of the unit avoids scrambling more payloads than is required to render ineffective techniques in a receiver for coping with the loss of data. Thus, effective protection is achieved whilst the burden on an authorised receiver providing access to the partially scrambled stream is kept as low as possible. Because the maximum number can be set, factors like the profile of typical receivers, the manner of encoding and the number of selected units can be taken into account.

According to another aspect, the invention provides a computer program adapted, when run on a computer, to configure the computer to execute a method according to the invention.

According to another aspect, the invention provides a signal carrying a data stream including transport stream packets, each transport stream packet having a header and a payload, wherein a sequence of transport stream packets has payloads carrying encoded data elements, arranged in units, each unit being of a certain type, wherein at least part of the payload of each transport stream packet in a sub-sequence, of the sequence, is scrambled, wherein for each unit of a type corresponding to a selected type, the sub-sequence includes at least one of the transport stream packets carrying data forming part of that unit, wherein at least one of the transport stream packets includes data indicating a boundary between two subsequent units.

The signal is suitable for being unicast, multicast or broadcast to receivers with limited processing capacity for descrambling, but equipped with decoders with a high degree of tolerance to data loss. These include wireless devices in particular.

The invention will now be displayed in further detail with reference to the accompanying drawings, in which.

The invention will be explained in an embodiment for partially scrambling a data stream including transport stream packets in accordance with ISO/IEC 13818-1, or the MPEG-2 systems standard. In this particular embodiment, MPEG-2 is used as the delivery mechanism for audiovisual data encoded in accordance with the H.264/AVC standard. It will be understood that the invention can be applied to other delivery mechanisms than MPEG-2. One example is the Internet Protocol (IP), which defines IP datagrams having a header and a payload. Similarly, the use of H.264/AVC as content encoding technique is an advantageous example, due to the high degree of compression and acceptable quality that is achievable. However, an alternative would be MPEG-2 video coding, in which the encoded video is arranged in frames.

In the example to be described in detail, the data stream is in the MPEG-2 transport stream format. The example may be adapted to the program stream format. The term transport stream packet therefore does not mean that the use of a particular format is prescribed. It is observed that, when the program stream format is used, data is transmitted in PES packets, each having a header, and that PES packets are grouped in packs, each having a pack header.

Figure 1:
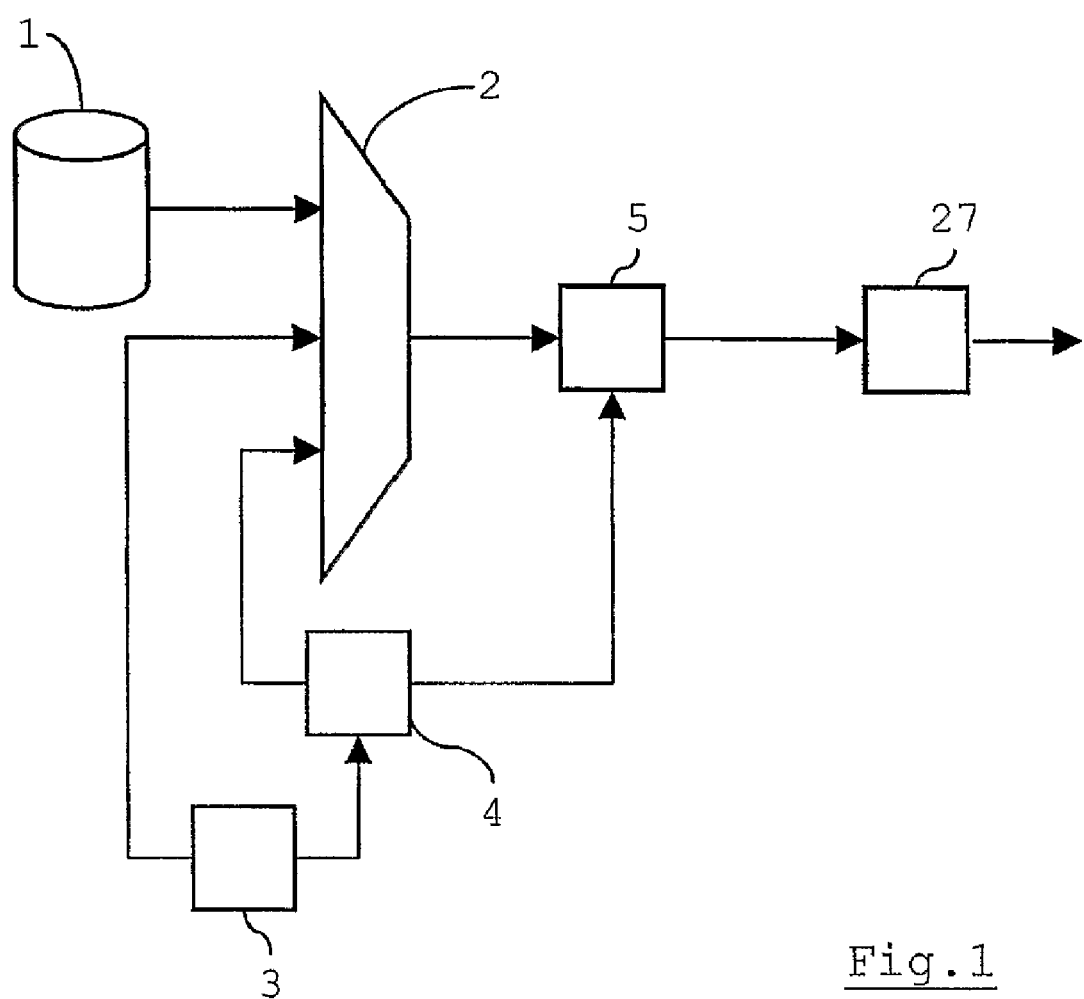
FIG. 1 shows schematically a system for partially scrambling a data stream.

In FIG. 1, a video file server 1 provides an MPEG-2 systems stream carrying H.264 encoded video, amongst others. A multiplexer 2 splices Conditional Access (CA) messages into the data stream. The CA messages include Entitlement Management Messages (EMMs), generated by an EMM generator 3, and Entitlement Control Messages (ECMs), generated by an ECM generator 4. The ECM generator 4 generates Control Words (CWs). These are provided to a scrambling unit 5 arranged to partially scramble the output data stream of the multiplexer 2. The CWs are encrypted under a service key provided by the EMM generator 3, which packs the service keys into the EMMs. Thus, the CA scheme used corresponds substantially to the Digital Video Broadcasting (DVB) common scrambling algorithm, which is known per se, e.g. from ETSI technical report 289, and not described in further detail here. It is observed that the separation into components in FIG. 1 is of a functional nature. Several or all of these could be combined into a single physical device, just as the functionality of certain of these components could be provided separately by different devices. Furthermore, the implementation of this functionality may be in software or hardware.

Figure 2:
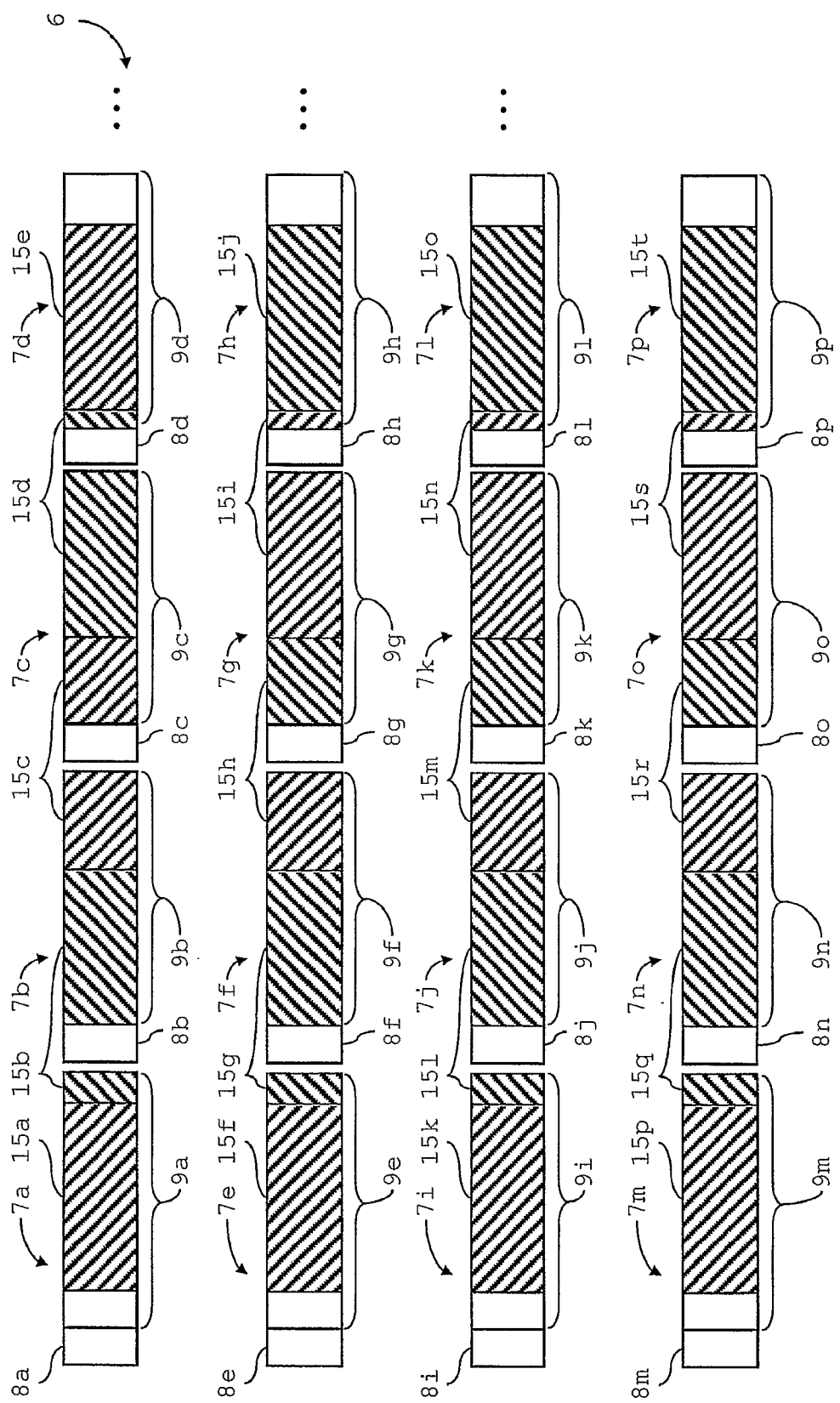
FIG. 2 shows schematically a data stream comprised of transport stream packets in accordance with the MPEG-2 standard.

FIG. 2 shows a data stream 6 including transport stream (TS) packets 7a-7p. Each TS packet 7 has a TS packet header 8a-8p and a TS packet payload 9a-9p. The data stream 6 is a multiplex of elementary streams. Each elementary stream corresponds to a coded bit stream, e.g. a coded audio, video or data stream. For example, the ECMs are carried in a separate elementary stream, whereas at least one elementary stream received by the scrambling unit 5 is a stream of H.264 encoded video.

Figure 3:
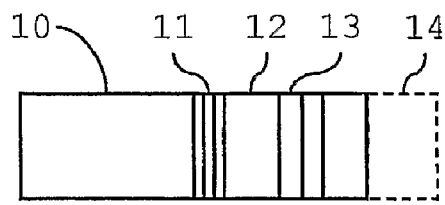
FIG. 3 shows schematically the composition of an MPEG-2 transport stream packet header.

FIG. 3 shows the make-up of a TS packet header 8. It includes a sync byte 10, a payload_unit_start_indicator 11, a packet identifier (PID) field 12, a transport scrambling control field 13 and, optionally, an adaptation field 14. Other parts are described in ISO/IEC 13818-1. Each elementary stream corresponds to a unique PID. Thus, the scrambling unit 5 is able to identify the elementary stream or streams carrying H.264 encoded video. For the sake of efficiency, only the TS packets 7 belonging to such a stream or streams are processed. As is known from ISO/IEC 13818-1, an MPEG-2 transport stream will contain Programme Specific Information (PSI) identifying the various elementary streams and their allocated PIDs, as well as the type of data carried in the elementary stream. One type, identifiable in a Programme Association Table (PAT), is H.264. The scrambling unit 5 can use the PSI to identify the PID(s) of the elementary stream(s) to be partially scrambled.

In the following, it will be assumed that only one elementary stream is to be partially scrambled. The TS packets 8 with the PID corresponding to that particular elementary stream are retrieved from the data stream, thus forming a sequence of TS packets 8 having TS packet payloads 9 carrying H.264 encoded data elements.

Preferably, the encoded data elements contain at least parts of encoded representations of pictures. A picture is a frame or field in a video sequence (i.e. a full image or alternate lines). Macroblocks, blocks of sixteen by sixteen luma and chroma samples, are formed from the data of each picture. This is done in accordance with raster scan, a mapping of the rectangular two-dimensional pattern of macroblocks in the picture to a one-dimensional pattern, such that the first entries in the one-dimensional pattern are from the first top row of the two-dimensional pattern scanned from left to right, followed by macroblocks from the next rows, each scanned from left to right. The picture is partitioned into slice groups, subsets of macroblocks. A slice contains macroblocks that are consecutive in the raster scan within the slice group, but not necessarily within the picture. Thus, it is possible to allocate every other macroblock in the raster scan of the picture to a separate slice group, for example. A slice is decoded only on the basis of samples from within that slice, i.e. independently of the samples in other slices. However, when the data in one slice is lost in transmission, use may be made of the data in another slice to fill in the blanks in the decoded picture.

The frequency of sampled pictures provides a division in time, in addition to the topographical partitioning provided by the slices. H.264 is an example of a predictive encoding method: a pixel value is encoded as the sum of a predicted value and a difference value, which latter value is reduced as much as possible during encoding. For slices containing data from the first picture and from pictures defined as random access points, the predicted values are based only on values within that picture itself, and not on those in pictures at a different point in the order of transmission. Such slices are called intra-coded slices. The remaining slices may be coded so as only to be decodable using also values in other pictures in the order of a sequence of pictures. Thus, it is possible to decode a sequence of encoded pictures by starting at an intra-coded picture, but not by starting at another type of encoded picture.

Thus far, the description of relevant parts of H.264 has concerned only the so-called Video Coding Layer (VCL). To transmit the encoded slices, they are packaged into so-called Network Adaptation Layer (NAL) units 15a-15x (FIG. 1). Each slice is contained in a single NAL unit 15. Sets of NAL units 15 form Access Units (AUs). Each AU always contains a primary coded picture, i.e. all macroblocks of the picture. It will be appreciated that the data size of a NAL unit 15 varies according to the number of slice groups, the type of (entropy) coding used to generate the slices, etc. Thus, the sequence of TS packets 7 contains NAL units 15 of varying lengths.

Each set of NAL units 15 forming an AU is carried in one Program Elementary Stream (PES) packet 16, which in turn is carried by the TS packets 7. The composition of the PES packet 16 is shown in FIG. 3. It includes a packet start code pre-fix 17a-d (see also FIG. 2). The packet start code prefix 17 is a code of twenty-four bits' length. Together with a stream_id 18 it constitutes a packet start code that identifies the beginning of a PES packet 16. In contrast to the TS packets 7, which are of a standard, fixed length, a PES packet 16 is of variable length. The length is indicated in a PES packet length field 19. This field 19 is optionally followed by a PES header 20. Thereafter comes the PES packet payload 21, i.e. the NAL units 15.

It is noted that the stream_id 18 specifies both the type and number of an elementary stream. It may thus be used as an alternative to identify the elementary stream to be partially scrambled by the scrambling unit 5. The start of a new PES packet 16 always follows immediately upon a TS packet header 8, in which case the payload_unit_start_indicator 11 has the value 'TRUE'. No two PES packets 16 start in the same TS packet 7.

Figure 4:
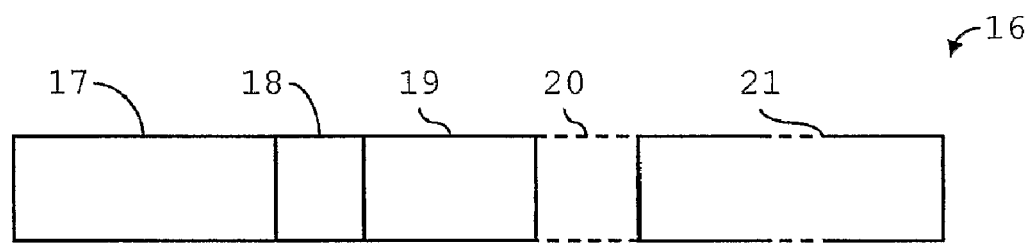
FIG. 4 shows schematically the composition of a Program Elementary Stream packet carried in the data stream of FIG. 2.
Figure 5:
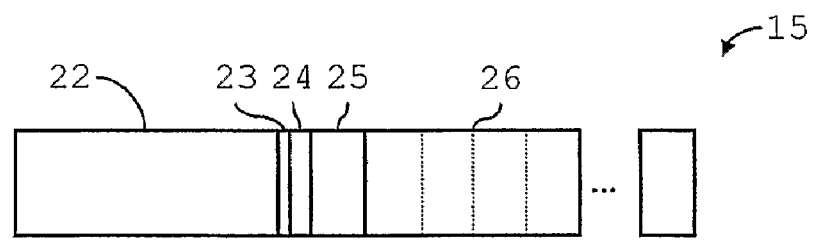
FIG. 5 shows schematically the composition of a Network Adaptation Layer unit as defined by the H.264/AVC standard, and carried in the data stream of FIG. 2.

FIG. 4 shows the composition of a NAL unit 15 in a format for transmission in a byte stream. It is preceded by a start code pre-fix 22. The start code pre-fix 22 is a unique sequence of three bytes, equal to '0x00 0001', embedded in the byte stream as a pre-fix to each NAL unit 15. Thus, the start code pre-fix 22 indicates a boundary between two subsequent NAL units 15. The start code pre-fix 22 is followed by a forbidden_bit 23, a nal_storage_idc 24 and a nal_unit_type 25.

Ten different types are defined by the encoding technique with which the slices have been formed. One of these is the Access Unit Delimiter (AUD) type. The presence of a NAL unit 15 of this type indicates the boundary between subsequent AUs. The first NAL unit 15 of an AU is always of this type. Another possible type is the Instantaneous Decoder Refresh (IDR) type. Such a NAL unit 15 contains an Intra coded slice. Thus, the corresponding value of the nal_unit_type 25 indicates that byte-aligned data 26 following it is part of a data element representing an intra-coded picture.

Having retrieved from the data stream 6, the elementary stream to be partially scrambled, the scrambling unit monitors the TS packet payloads 9 of the TS packets 7 in that stream for the presence of the start code pre-fix 22. The scrambling unit 5 is able to differentiate between the packet start code pre-fix 17 of a PES packet 16 and the start code pre-fix 22 indicating a boundary between subsequent NAL units 15. It is observed that a PES packet start code prefix 17 always follows immediately upon a TS packet header 8. The scrambling unit 5 is able to monitor parts of the TS packet payload 9 separated by the TS packet header 8 by components indicating the start of an elementary stream packet, i.e. a PES packet.

Once the end of a NAL unit 15 has been identified, the system determines the type of the NAL unit 15 as indicated by the nal_unit_type 25. At least if the type corresponds to IDR, one or more of the TS packets 7 carrying data forming part of that NAL unit 15 is selected for inclusion in a sub-sequence. The TS packet payloads 9 of the TS packets 7 in the sub-sequence are scrambled. It is observed that the term 'sub-sequence' is a notional one. It is used herein to refer to an ordered sub-set, i.e. a lesser number, of the TS packets 7 in the sequence of TS packets 7 forming the elementary stream.

Preferably, a number of additional TS packets 7 following the first TS packet 7 carrying data forming part of the selected NAL unit 15 is also selected for inclusion in the sub-sequence to be scrambled. These additional TS packets 7 are selected from the same elementary stream on the basis of the PID as determined from the PID field 12. The system includes means for adjusting the number of additional packets that are selected. Thus, the operator of a conditional access system can achieve a compromise between the level of content protection and the level of processing capacity needed to descramble the partially scrambled stream.

The fraction of scrambled TS packets 7 in the sequence carrying the elementary stream may be relatively low when selection is based on the presence of NAL units 15 of type IDR. In such cases additional TS packets 7 may be selected for scrambling. In an advantageous embodiment, the system is configured or configurable to select units of types other than IDR at random. The TS packet payload 7 of at least one of the TS packets 7 carrying the selected unit is also scrambled. The other types may be all or a sub-set of the nine defined types other than IDR. In one embodiment, the rate at which additional TS packets 7 are included in the sub-sequence for scrambling is continuously adjusted. This is done in such a manner as to keep the fraction of the TS packets 7 in the sub-sequence relative to all TS packets in the sequence representing the elementary stream at, or below, a certain level, e.g. 5%.

The partially scrambled data stream is modulated by a transmitter 27. In a preferred embodiment, the MPEG-2 transport stream packets are modulated onto CDMA (Code Division Multiple Access) carriers in accordance with the system E variant of the Digital Audio Broadcasting standard (ETSI 300 401). Thus, the transmitter transmits a signal carrying the partially scrambled data stream. By using a wireless transmission technique, the partially scrambled data stream is made available to mobile receiver/decoder devices. These devices are provided with descrambling and decoding capability, preferably implemented in software. In that case, the signal, more particularly the way in which the data stream has been scrambled, allows descrambling and decoding with low processing intensity.

It will be clear that the scrambling is carried out at the transport stream level, i.e. by scrambling at least part of the TS packet payloads 9 of selected TS packets 7. The TS packet header 8, specifically the transport scrambling control field 13, provides an effective way of signalling to the receiver whether a particular packet has a scrambled payload. Thus, the receiver need not examine the entire contents of each packet's payload to selectively descramble the encoded data. Rather, it can perform the descrambling prior to processing the actual payload contents.

The invention is not limited to the embodiment described herein, but may be varied within the scope of the accompanying claims. For example, the encoded data elements may be carried in the payloads of transport stream packets as defined by other protocols for wireless transmission. Also, scrambling may be carried out at the PES level, meaning that the payload of a PES packet 16 determined to carry a NAL unit 15 of a specific type (e.g. IDR) is included amongst the packet payloads to be scrambled.

The invention claimed is:

1. A method comprising:
partially scrambling a data stream including transport stream packets, each transport stream packet having a header and a payload, wherein the payload comprises at least a part of a program elementary stream, wherein a sequence of transport stream packets has payloads carrying one or more packet elementary streams comprising a PES packet payload, wherein the PES packet payload carries encoded data elements, arranged in units, the method including:
receiving the data stream at a port;
selecting transport stream packets forming a sub-sequence of the sequence, and
scrambling the payloads of each transport stream packet in the sub-sequence, the method further including:
monitoring the payloads of the transport stream packets in the sequence for the presence of data indicating a boundary between two subsequent units;
determining a type of one of the two subsequent units following the data indicating the boundary; and
if the type corresponds to a predefined type, including at least one of the transport stream packets carrying data forming part of the one of the two subsequent units in the sub-sequence.

2. The method according to claim 1, wherein the data stream is a multiplex of elementary streams, the method including identifying at least one elementary stream including the sequence of transport stream packets and monitoring only payloads of packets in the identified elementary stream(s).

3. The method according to claim 1, wherein the selected units include units containing at least part of an encoded representation of a picture.

4. The method according to claim 1, wherein each unit contains an indication of the type of data to follow and a part containing that data, wherein the type of each unit in the monitored payloads is determined from the indication and the unit is included among the selected units if the type corresponds to at least one specific type.

5. The method according to claim 4, wherein units of types other than the specific type(s) are randomly included among the selected units.

6. The method according to claim 4, wherein the types are defined by the encoding technique with which the encoded data elements have been formed.

7. The method according to claim 4, wherein the encoded data elements are decodable using a predictive decoding technique and the specific types include a type of data element allowing a prediction to be derived from only the decoded data belonging to the data element.

8. The method according to claim 1, wherein up to a maximum number of transport stream packets following a first transport stream packet carrying data forming part of a selected unit are included in the sub-sequence.

9. A computer based system for partially scrambling a data stream including transport stream packets, each transport stream packet having a header and a payload, wherein the payload comprises at least a part of a program elementary stream, wherein a sequence of transport stream packets has payloads carrying one or more packet elementary streams comprising a PES packet payload, wherein the PES packet payload carries encoded data elements, arranged in units, the system including:

a port for receiving the data stream; and an arrangement for processing the data in the stream, wherein the system is configured to select transport stream packets forming a sub-sequence of the sequence, and to scramble the payloads of each transport stream packet in the sub-sequence, wherein the system is configured to monitor the payloads of the transport stream packets in the sequence for the presence of data indicating a boundary between two subsequent units, to determine a type of one of the two subsequent units following the data indicating the boundary, and if the type corresponds to a predetermined type, to include at least one of the transport stream packets carrying data forming part of the one of the two subsequent units in the sub-sequence.

10. The computer based system according to claim 9, configured to include up to a maximum number of transport stream packets following a first transport stream packet carrying data forming part of a selected unit in the sub-sequence, and provided with an arrangement for setting the maximum number.

11. A computer-readable non-transitory storage medium containing a set of instructions that, when run on a computer, performs a method of partially scrambling a data stream including transport stream packets, each transport stream packet having a header and a payload, wherein the payload comprises at least a part of a program elementary stream, wherein a sequence of transport stream packets has payloads carrying one or more packet elementary streams comprising a PES packet payload, wherein the PES packet payload carries encoded data elements, arranged in units, the method including the steps of:

selecting transport stream packets forming a sub-sequence of the sequence, and scrambling the payloads of each transport stream packet in the sub-sequence, monitoring the payloads of the transport stream packets in the sequence for the presence of data indicating a boundary between two subsequent units, determining a type of one of the two subsequent units following the data indicating the boundary, and if the type corresponds to a predetermined type, including at least one of the transport stream packets carrying data forming part of the one of the two subsequent units in the subsequence.

12. A method comprising:

generating a data stream including transport stream packets, each transport stream packet having a header and a payload, wherein the payload comprises at least a part of a program elementary stream, wherein a sequence of transport stream packets has payloads carrying one or more packet elementary streams comprising a PES packet payload, wherein the PES packet payload carries encoded data elements, arranged in units, the method including:

selecting transport stream packets forming a sub-sequence of the sequence, and scrambling the payloads of each transport stream packet in the sub-sequence, monitoring the payloads of the transport stream packets in the sequence for the presence of data indicating a boundary between two subsequent units, determining a type of one of the two subsequent units following the data indicating the boundary, and if the type corresponds to a predetermined type, including at least one of the transport stream packets carrying data forming part of the one of the two subsequent units in the subsequence; and modulating the data stream at a transmitter.

* * * * *